United States Patent
Zhu et al.

(10) Patent No.: US 10,860,500 B2
(45) Date of Patent: Dec. 8, 2020

(54) SYSTEM, APPARATUS AND METHOD FOR REPLAY PROTECTION FOR A PLATFORM COMPONENT

(71) Applicant: Intel Corporation, Santa Clara, CA (US)

(72) Inventors: Zhenyu Zhu, Folsom, CA (US); Mikal Hunsaker, El Dorado Hills, CA (US); Chai Huat Gan, Bukit Mertajam (MY)

(73) Assignee: Intel Corporation

( * ) Notice: Subject to any disclaimer, the term of this patent is extended or adjusted under 35 U.S.C. 154(b) by 0 days.

(21) Appl. No.: 16/258,828

(22) Filed: Jan. 28, 2019

(65) Prior Publication Data

US 2019/0155753 A1    May 23, 2019

(51) Int. Cl.
| | |
|---|---|
| *G06F 12/00* | (2006.01) |
| *G06F 12/14* | (2006.01) |
| *G06F 21/60* | (2013.01) |
| *G06F 21/79* | (2013.01) |
| *G06F 21/64* | (2013.01) |
| *G06F 21/10* | (2013.01) |

(52) U.S. Cl.
CPC ........ *G06F 12/145* (2013.01); *G06F 12/1483* (2013.01); *G06F 21/10* (2013.01); *G06F 21/606* (2013.01); *G06F 21/64* (2013.01); *G06F 21/79* (2013.01)

(58) Field of Classification Search
CPC .... G06F 12/145; G06F 12/1483; G06F 21/10; G06F 21/606; G06F 21/64; G06F 21/79
See application file for complete search history.

(56) References Cited

U.S. PATENT DOCUMENTS

| | | | | |
|---|---|---|---|---|
| 10,067,834 B1* | 9/2018 | Montero | ............ | G06F 11/1469 |
| 2002/0174278 A1* | 11/2002 | Komatsu | ................ | G06F 9/468 |
| | | | | 710/107 |
| 2008/0237333 A1* | 10/2008 | Fukuda | ................... | G06F 21/77 |
| | | | | 235/375 |
| 2012/0297206 A1* | 11/2012 | Nord | .................... | G06F 21/602 |
| | | | | 713/193 |
| 2014/0223198 A1* | 8/2014 | Saranghar | ............... | G06F 13/14 |
| | | | | 713/193 |
| 2015/0277930 A1* | 10/2015 | Sarangdhar | ........... | G06F 21/572 |
| | | | | 713/2 |
| 2016/0328300 A1* | 11/2016 | Rahardjo | ............ | G06F 11/1417 |

OTHER PUBLICATIONS

Intel Corporation, "Serial Flash Hardening Product, External Architecture Specification (EAS), Rev 0.7," Mar. 2013, 24 pages.

* cited by examiner

*Primary Examiner* — Daniel D Tsui (74) *Attorney, Agent, or Firm* — Trop, Pruner & Hu, P.C.

(57) ABSTRACT

In one embodiment, an apparatus includes: an interface controller to receive a request from an external device coupled to the apparatus to access a flash memory coupled to the apparatus, the request comprising an access request to a replay protection monotonic counter (RPMC) of the flash memory; and a flash controller coupled to the interface controller. In turn, the flash controller includes: an atomic sequencer to arbitrate accesses to the RPMC by a plurality of components; and a mapper to map the access request to a selected counter of the RPMC associated with the external device. Other embodiments are described and claimed.

20 Claims, 7 Drawing Sheets

SYSTEM, APPARATUS AND METHOD FOR REPLAY PROTECTION FOR A PLATFORM COMPONENT

TECHNICAL FIELD

Embodiments relate to providing security for platform components.

BACKGROUND

Replay protection provides a building block that enables additional security of memory access protection against hardware attacks where an attacker has physical access to a non-volatile memory. With physical access, the attacker is able to modify contents by de-soldering the device and reprogramming or replacing it. An attacker also is able to capture information by probing the device using a logic analyzer and replay at a different time. Another possible attack mechanism can modify memory contents on the fly by inserting field programmable gate array hardware in the middle.

These attacks are known as replay attacks, which can be detected via use of monotonic counter values stored in the non-volatile memory. The monotonic counters can be protected using replay protection monotonic counter (RPMC) commands in accordance with the Serial Flash Hardening Product, External Architecture Specification Rev. 0.7 (2013, Intel Corporation), to be communicated between a system on chip (SoC) flash controller and the non-volatile memory. While this technique provides protection for SoC components, it does not extend to other devices. As such, external platform components do not have access to these monotonic counters for replay protection, and inclusion of additional counters for these devices is complex and expensive.

DETAILED DESCRIPTION

In various embodiments, techniques enable replay protection monotonic counter (RPMC) services to be provided to additional devices present in a given computing platform, in addition to a system on chip (SoC) or other processor directly coupled to a flash memory or other platform component incorporating one or more RPMCs. In embodiments described herein, such platform components that leverage replay protection counters of another device may include, as examples, an embedded controller, external security controller, and so forth. In embodiments herein, the techniques provide the capability for platform components to use RPMC services to protect their own critical data stored on the flash memory.

While different implementations to provide RPMC services to external platform components may exist, in a particular embodiment a device coupled to an SoC via an extended serial peripheral interface (eSPI) interconnect may use in-band RPMC commands in a master attached flash sharing mode. The security of this mechanism is enforced in hardware without the risk of host software interference. RPMC services are thus provided to external platform components via a secure mechanism. Embodiments may thus provide platform anti-replay flows with more flexible platform configurations with lower bill of material (BOM) costs. As a result, RPMC services can be provided to external platform components without adding extra components, pins and cost. Embodiments can create RPMC platform usages with external components (e.g., an embedded controller). Embodiments may also improve security of a master attached flash sharing scheme, in that security may be enforced in hardware without risk of host software interference.

Figure 1:
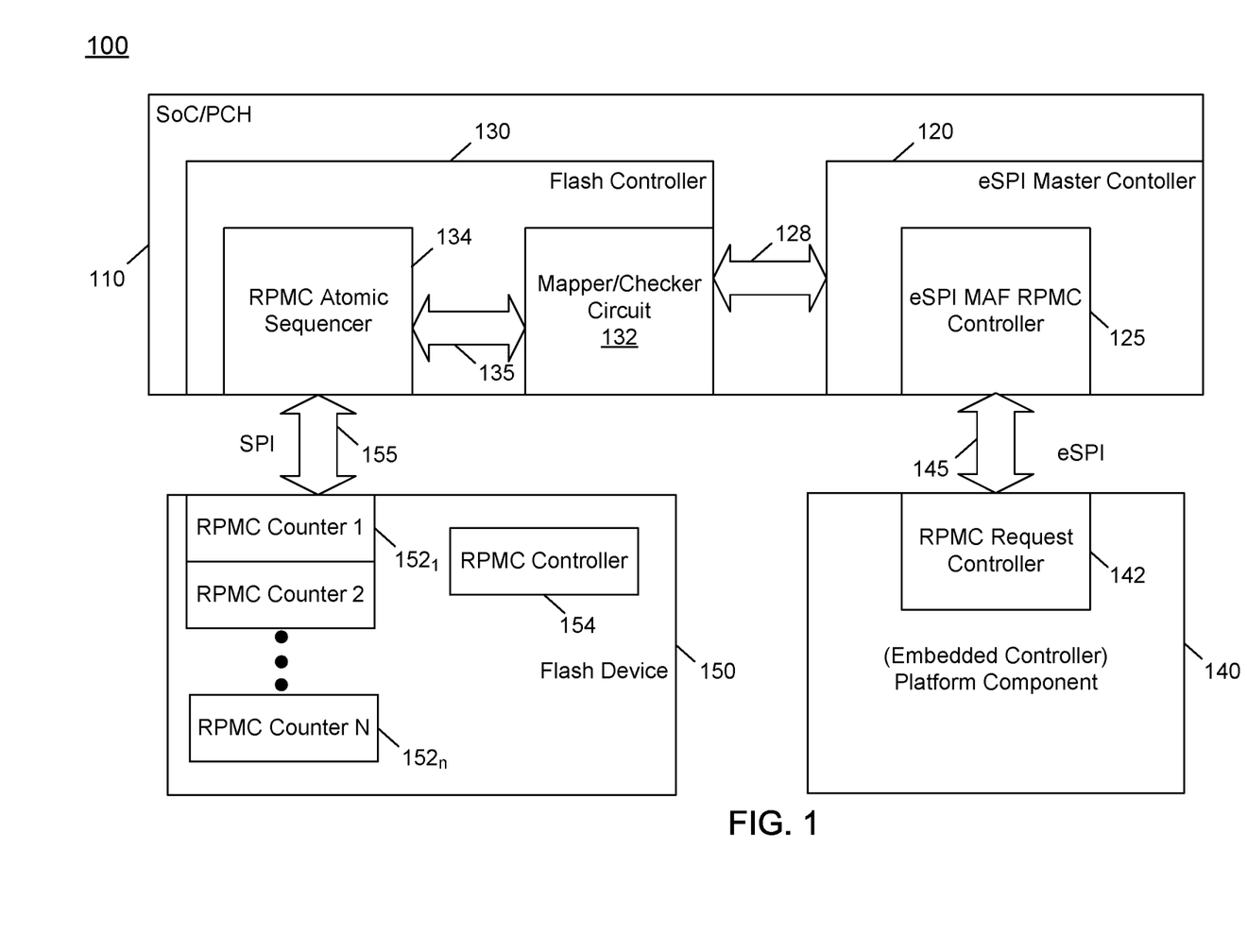
FIG. 1 is a block diagram of a portion of a platform in accordance with an embodiment of the present invention.

Referring now to FIG. 1, shown is a block diagram of a portion of a platform in accordance with an embodiment of the present invention. As shown in FIG. 1, platform 100 may be any type of computing platform, ranging from a portable computing device such as a mobile telephone, tablet computer or so forth to a larger device such as a laptop computer, desktop computer, server or so forth.

In any event, the portion of platform 100 shown in FIG. 1 includes a main system processor, illustrated in FIG. 1 as a system on chip (SoC) 110. SoC 110 may be a main processor of the system such as a given central processing unit (CPU), application processing unit (APU) or so forth. Note that in the level of detail shown in FIG. 1, general purpose and specialized processing cores such as in-order and/or out-of-order processor cores, graphics processors and so forth are not illustrated. Instead, only a peripheral controller portion of SoC 110 is illustrated.

As seen, this peripheral control circuitry includes a master controller 120 and a flash controller 130. More specifically, master controller 120 may be implemented as an enhanced serial peripheral interface (eSPI) master controller to act as a master controller for one or more peripheral devices coupled to SoC 110 via an interconnect 145, illustrated in FIG. 1 as an eSPI interconnect. For ease of illustration a single external device 140 is shown. In the embodiment of FIG. 1, external device 140 is a given platform component such as an embedded controller. For purposes of interacting with RPMC hardware of a flash memory as described herein, embedded controller 140 includes an RPMC request controller 142. Understand of course that a variety of additional control circuitry is present in embedded controller 140 to perform various operations such as embedded control functions for a given platform.

To enable embedded controller 140 to leverage RPMC hardware within another component, master controller 120 includes a RPMC controller 125. More specifically, controller 125 may be implemented as an eSPI master attached flash (MAF) RPMC controller 125. In embodiments, controller 125 may be implemented as a hardware engine or circuit to process external RPMC requests, forward them to flash controller 130, and generate an RPMC response back to embedded controller 140. As described further herein in a particular embodiment, controller 125 may leverage an RPMC eSPI packet format to perform RPMC operations on behalf of embedded controller 140.

Still with reference to FIG. 1, master controller 120 couples to flash controller 130 via an internal interconnect 128. Flash controller 130 includes a mapper circuit 132. More specifically, mapper circuit 132 is implemented as a hardware circuit to check or verify incoming requests for RPMC functions received from external devices via master controller 120. To this end, mapper circuit 132 may check and map incoming RPMC requests to authenticate that they are received from an authorized agent. To this end, mapper circuit 132 may, in response to a received access request, check and map, e.g., based at least in part on address, the request to a given one of multiple counters present in flash device 150.

When a request has been verified and mapped to a given counter via mapper circuit 132, the request is sent via an internal interconnect 135 to an atomic sequencer 134. More specifically, atomic sequencer 134 may be implemented as a hardware circuit for handling multiple incoming requests for RPMC functions. To this end, atomic sequencer 134 may handle arbitrated RPMC multi-phase commands. When a given command is accepted within atomic sequencer 134, the accepted command is completed by sequencer 134 atomically. In embodiments, atomic sequencer 134 also may ensure that normal flash memory operations (namely read and write accesses) are not impacted and can complete normally.

Still with reference to FIG. 1, flash controller 130 couples to flash device 150 via a serial peripheral interface (SPI) interconnect 155. At the high level shown in FIG. 1, flash device 150 includes an RPMC counter 152. More specifically, counter 152 includes a plurality of individual RPMC counters $152_1$-$152_n$, each of which may be associated with a given component, either internal to SoC 110 or an external component such as embedded controller 140. As further illustrated in the high level of FIG. 1, flash device 150 includes an RPMC controller 154 implemented as a hardware circuit to perform control operations with respect to these counters. While not shown for ease of illustration, understand that flash device 150 further includes typical memory hardware including read and write control circuitry, memory arrays, error handling circuitry and so forth. And understand while shown at this high level in the embodiment of FIG. 1, many variations and alternatives are possible.

Figure 2:
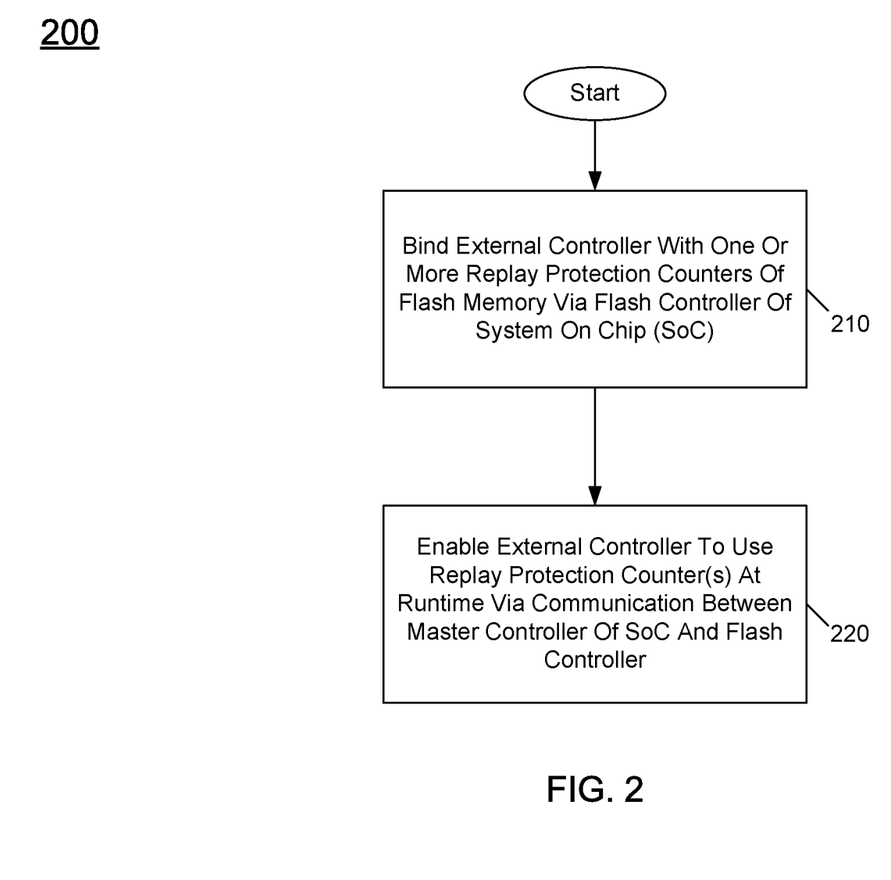
FIG. 2 is a flow diagram of a high level method of associating RPMC hardware with external components of a platform in accordance with an embodiment.

Referring now to FIG. 2, shown is a flow diagram of a high level method of associating RPMC hardware with external components of a platform in accordance with an embodiment. As shown in FIG. 2, method 200 is in part a method for binding a given platform component with one or more RPMC counters of a flash memory of the platform to enable runtime use. At least a portion of method 200 is performed during a manufacturing process by original equipment manufacturer (OEM) during a building of a given computing platform.

As illustrated, method 200 begins by binding an external controller with one or more replace protection counters of a flash memory (block 210). More specifically, this binding may be performed by writing configuration information in a flash controller of an SoC or other processor that acts as an interface between the external controller and the flash memory. Here the external controller writes the root keys to the RPMC counter that it will use. The root keys are stored inside the flash device's RPMC counter circuitry during this binding arrangement.

Note that after this binding process has been completed and the platform is shipped, the associated RPMC counters can be used during runtime on behalf of the external controller. Thus as further illustrated in FIG. 2, at block 220, which may occur during runtime of the platform, the external controller is enabled to use the replay protection counters. More specifically, RPMC operations may be effected using the command protocols and interactions described further herein. Understand while shown at this high level in the embodiment of FIG. 2, many variations and alternatives are possible.

Embodiments provide an external platform RPMC flow, in which RPMC services use OP1 and OP2 commands of the Serial Flash Hardening Product, External Architecture Specification Rev. 0.7 (2013, Intel Corporation) for key and counter data management. OP1 messages may be used to pass the following commands: write root key register; update hashed message authentication code (HMAC) key register; increment monotonic counter; request monotonic counter; among others. In an embodiment, different OP1 commands are defined using an 8-bit command type field. OP2 messages may be used to read the RPMC counter data and extended status of the OP1 command. In an embodiment, OP1/OP2 commands are issued by an external RPMC master. An OP2 command is issued generally after an OP1. Responsive to such OP2 commands, the SoC/PCH responds with a payload phase to return extended status and counter data.

At a high level, an RPMC OP1 flow proceeds as follows from a given external platform component to the SoC, and in turn to a flash memory or other platform component including the replay protection counters: (1) platform component (e.g., embedded controller (EC)) requests sending an RPMC OP1 service request, e.g., by asserting an eSPI alert pin to the SoC/PCH (such OP1 commands include: write root key register; update HMAC key register; increment monotonic counter; and request monotonic counter, etc.); (2) SoC/PCH issues a Get Status command to query the cause of the alert; (3) EC responds with a flash request available status; (4) SoC/PCH issues a get flash np command to receive a non-posted flash access request from EC; (5) EC responds with an "Accept" response with a cycle type of RPMC OP1; (a) RPMC OP1 is a non-posted eSPI cycle on the master attached flash sharing channel; (b) the MAF RPMC request format is defined in Table 1 below, where the value of the length/data field depends on which OP1 command type it is.

TABLE 1

| Byte# | 7 | 6 | 5 | 4 | 3 | 2 | 1 | 0 |
|---|---|---|---|---|---|---|---|---|
| 0 | eSPI Cycle Type: RPMC OP1 = 03 h | | | | | | | |
| 1 | Tag [3:0] (0 h) | | | | Length [11:8] = 0 h | | | |
| 2 | Length [7:0] = 28 h-40 h | | | | | | | |
| 3 | RPMC Command Type [7:0] | | | | | | | |
| 4 | RPMC Command Address [7:0] | | | | | | | |
| 5 | Reserved [7:0] | | | | | | | |
| 6 . . . 63 | RPMC Key/Signatures | | | | | | | |

Still describing the high level RPMC OP1 flow, (6) after SoC/PCH receives the external RPMC request, it parses and forwards it to the SoC flash controller; (7) SoC checks the counter address in the external RPMC request packet, which contains an eSPI RPMC address-to-flash physical RPMC counter mapping; (a) if the eSPI RPMC address exceeds the allocated RPMC counter that the flash memory can support, the request is completed unsuccessfully without data; (8) if the eSPI RPMC packet passes SoC's checks, the flash controller initiates an atomic transaction to the RPMC engine of the flash memory. In an embodiment, this transaction is an OP1 command to the flash memory with the data received from EC. Then the flash controller polls the flash memory with either a read_status or OP2 based on flash's RPMC serial flash discovery protocol (SFDP) table or another parameter table stored in the flash device that includes all RPMC parameters the flash device supports, until the busy bit is 0; (9) once the polling is completed, the flash controller forwards the status to the eSPI controller; (10) eSPI controller then creates a PUT_FLASH_Cycle to EC based on the status from the flash memory. The packet format of the completion is shown in Table 2. Although described with this exemplary flow, understand that in other embodiments, another type of communication flow may occur to enable an external device to access replay protection counters of a flash memory or other such component.

TABLE 2

| Byte# | 7 | 6 | 5 | 4 | 3 | 2 | 1 | 0 |
|---|---|---|---|---|---|---|---|---|
| 0 | | | eSPI Cycle Type: RPMC Completion | | | | | |
| 1 | | Tag [3:0] | | | Length [11:8] = 0 h | | | |
| 2 | | | | Length [7:0] | | | | |

Figure 3:
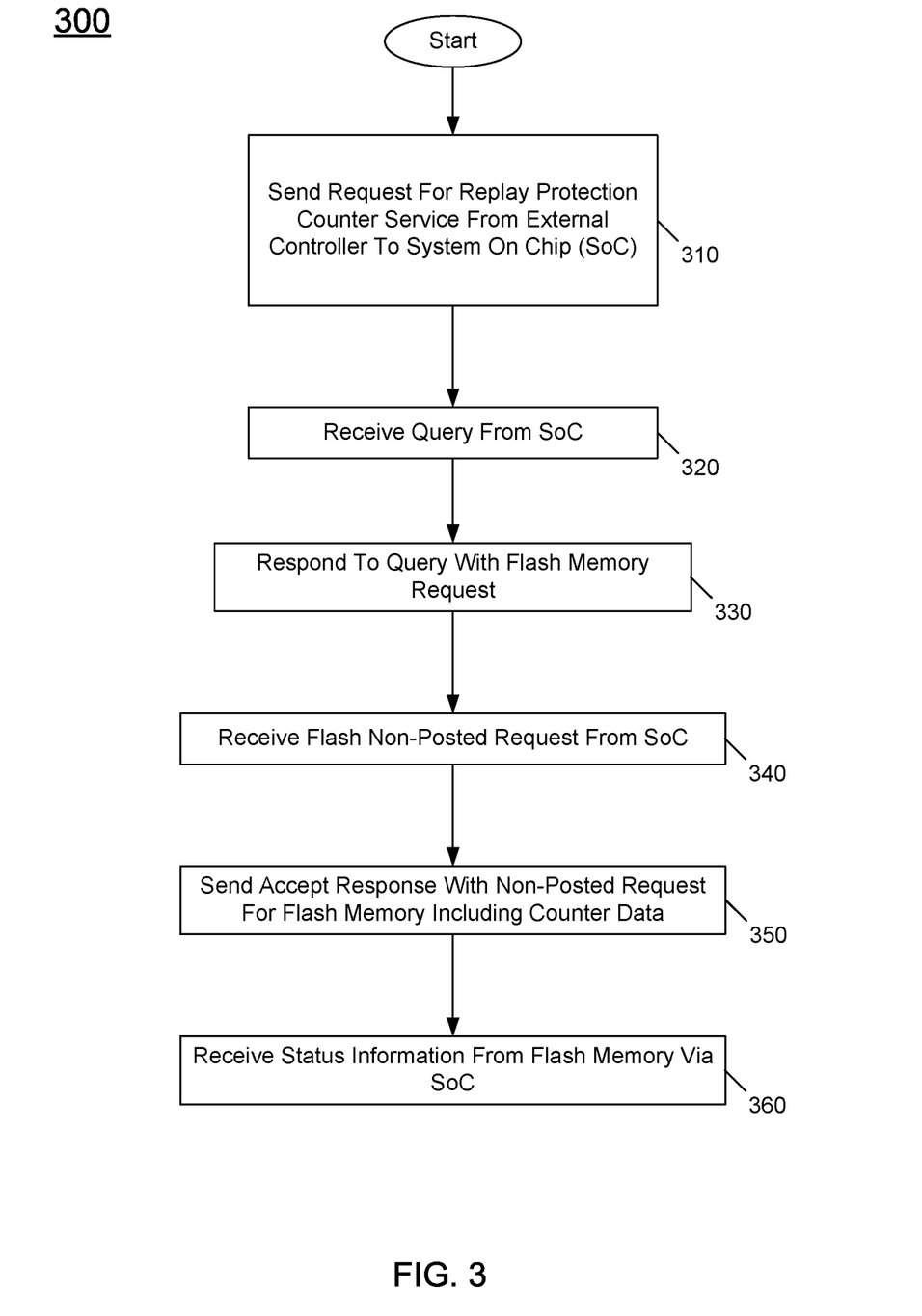
FIG. 3 is a flow diagram of a method in accordance with another embodiment of the present invention.

Referring now to FIG. 3, shown is a flow diagram of a method in accordance with another embodiment of the present invention. More specifically, method 300 is a high level method for issuing an RPMC request from an external controller to a flash memory or other device including RPMC counters. As such, embodiments may be performed by hardware circuitry, firmware, software and/or combinations thereof.

As illustrated in FIG. 3, method 300 begins by sending a request for replay protection counter service from the external controller to the SoC (block 310). In a particular embodiment, this request may be sent via an eSPI interconnect. Note that in an embodiment, this request may not be the actual request for a given replay protection counter service, but instead a generic request to initiate such request, e.g., triggered via an alert pin.

In any event, control next passes to block 320 where the external controller receives a query from the SoC. More specifically, this query seeks the cause of the alert. In response to this query, at block 330 the external controller responds with a flash memory request, namely a request as to whether the flash memory is of an available status. Assuming so, at block 340 the external controller receives a request for a non-posted transaction to the SoC. At block 350 the external controller sends an accept response including a non-posted request for the flash memory. In an embodiment in which this request is for an update to an RPMC counter, the request may include counter data such as a current value of the associated RPMC counter, e.g., as maintained within the embedded controller. Finally at block 360 status information may be received from the flash memory via the SoC. This status information may be a response to the non-posted request, e.g., a status of the request. As an example this status information regarding the request includes both command status and the counter data. Understand while shown at this high level in the embodiment of FIG. 3, many variations and alternatives are possible.

At a high level, an RPMC OP2 flow proceeds as follows from a given external platform component to SoC, and in turn to flash memory or other platform component including the replay protection counters: (1) platform component (e.g., EC) requests sending an RPMC OP2 service request by asserting the eSPI alert pin to SoC/PCH; (a) OP2 command is used to obtain RPMC extended status and counter data; (2) SoC/PCH issues a Get Status command to query the cause of the alert; (3) EC responds with a flash request available status; (4) SoC/PCH issues a get flash np command to obtain a non-posted flash access request from EC; (5) EC responds with an "Accept" response with cycle type of RPMC OP2; (a) RPMC OP2 is a non-posted eSPI cycle on the master attached flash sharing channel; (b) the MAF RPMC request format is defined in Table 3 below, where the value of the length/data field depends on which OP2 command type it is.

TABLE 3

| Byte# | 7 | 6 | 5 | 4 | 3 | 2 | 1 | 0 |
|---|---|---|---|---|---|---|---|---|
| 0 | | | eSPI Cycle Type: RPMC OP2 = 04 h | | | | | |
| 1 | | Tag [3:0](0 h) | | | Length [11:8] = 0 h | | | |
| 2 | | | | Length [7:0] = 0 h | | | | |

Still describing the high level OP2 flow, (6) after SoC/PCH receives the external RPMC request, it parses and forwards it to the SoC flash controller; (7) SoC stores the last RPMC OP1's counter address. SoC flash controller starts an OP2 transaction to the attached flash's RPMC engine; (8) flash memory responds to the OP2 command with the status of the last received OP1 command; (9) eSPI controller then creates a PUT_FLASH_Cycle to EC based on the status and counter data from flash. The packet format of the completion is shown in Table 4. Although described with this exemplary flow, understand that in other embodiments, another type of communication flow may occur to enable an external device to access replay protection counters of a flash memory or other such component.

TABLE 4

| Byte# | 7 | 6 | 5 | 4 | 3 | 2 | 1 | 0 |
|---|---|---|---|---|---|---|---|---|
| 0 | | | eSPI Cycle Type: RPMC Completion | | | | | |
| 1 | | Tag [3:0] | | | Length [11:8] = 0 h | | | |
| 2 | | | | Length [7:0] = 32 h | | | | |
| 3 | | | Extended Status [7:0] | | | | | 0 |
| 4 . . . 15 | | | | Tag [95:0] | | | | |
| 16 . . . 19 | | | | Counter Data [31:0] | | | | |
| 20 . . . 51 | | | | Signature [255:0] | | | | |

Figure 4:
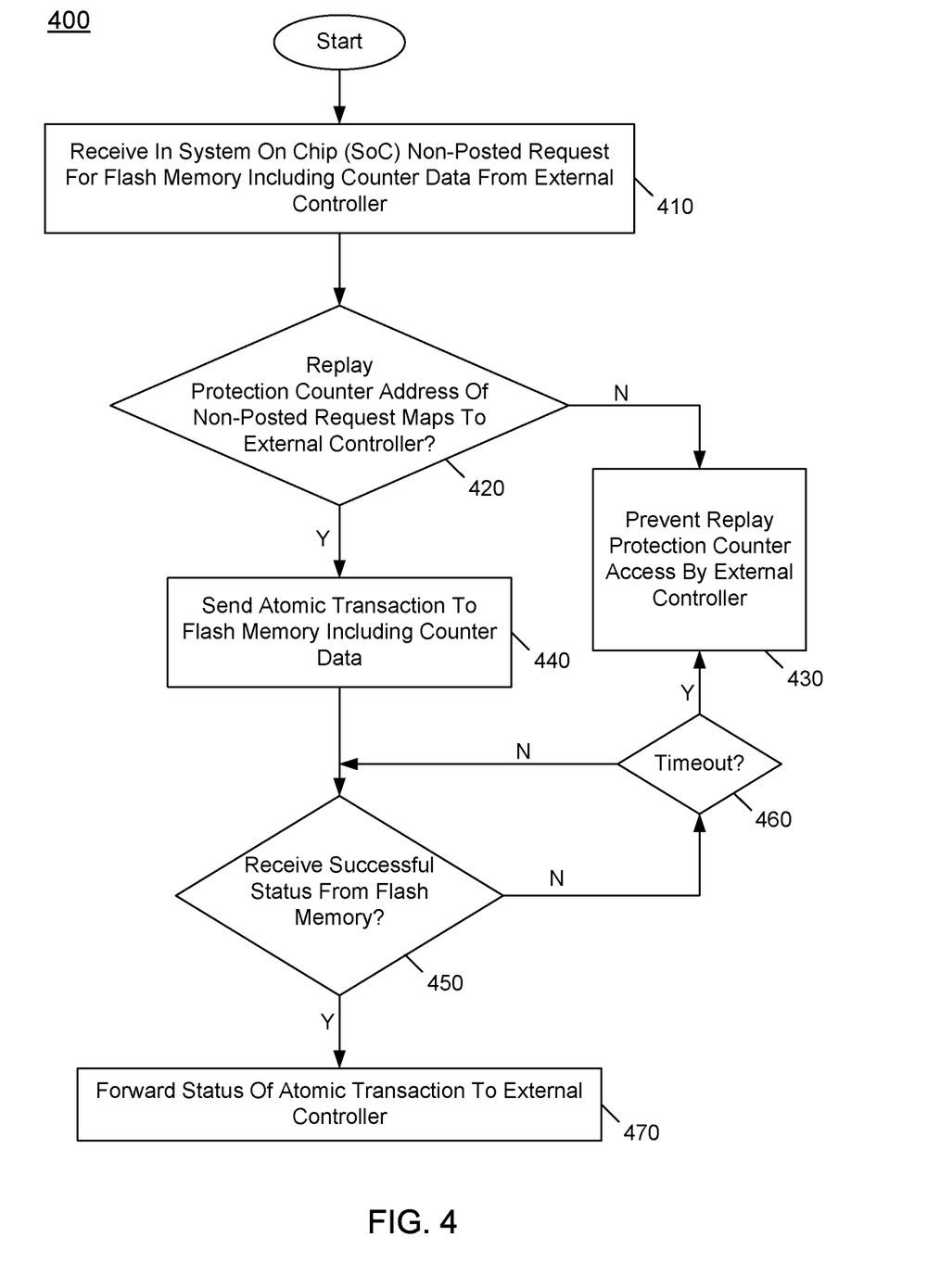
FIG. 4 is a flow diagram of a method in accordance with another embodiment of the present invention.

Referring now to FIG. 4, shown is a flow diagram of a method in accordance with another embodiment of the present invention. More specifically, method 400 is a high level method for issuing another RPMC request from an external controller to a flash memory or other device including RPMC counters. As such, embodiments may be performed by hardware circuitry, firmware, software and/or combinations thereof.

As illustrated in FIG. 4, at block 410 a non-posted request for access to the flash memory is received in an SoC. In the implementation of FIG. 4, note that this non-posted request includes counter data, such as a current value of the associated RPMC counter as maintained by the external controller. Next at diamond 420 it is determined whether the address associated with the request (corresponding to a given RPMC counter within the flash memory) maps to the external controller. Stated another way, this determination at diamond 420 determines and authenticates that the request is from a given external device that is associated with the particular RPMC counter sought to be accessed. If this authentication fails, control passes to block 430 where access to the given replay protection counter by the external controller is prevented.

Still with reference to FIG. 4, if instead the request is authorized, control passes to block 440 where, assuming appropriate sequencing has been effected, the request is sent to the flash memory as an atomic transaction including the counter data. At diamond 450, it is determined whether a successful status is received from the flash memory. If so, at block 470 the status of this atomic transaction is forwarded to the external controller. Note that if for some reason the atomic transaction is not successful, a timeout duration may be determined to have been met (at diamond 460). If so, the request fails and control passes to block 430 where the transaction is prevented. Although not shown for ease of illustration in FIG. 4, understand that a failure status may be communicated to the external controller. Understand while shown at this high level in the embodiment of FIG. 4, many variations and alternatives are possible.

Figure 5:
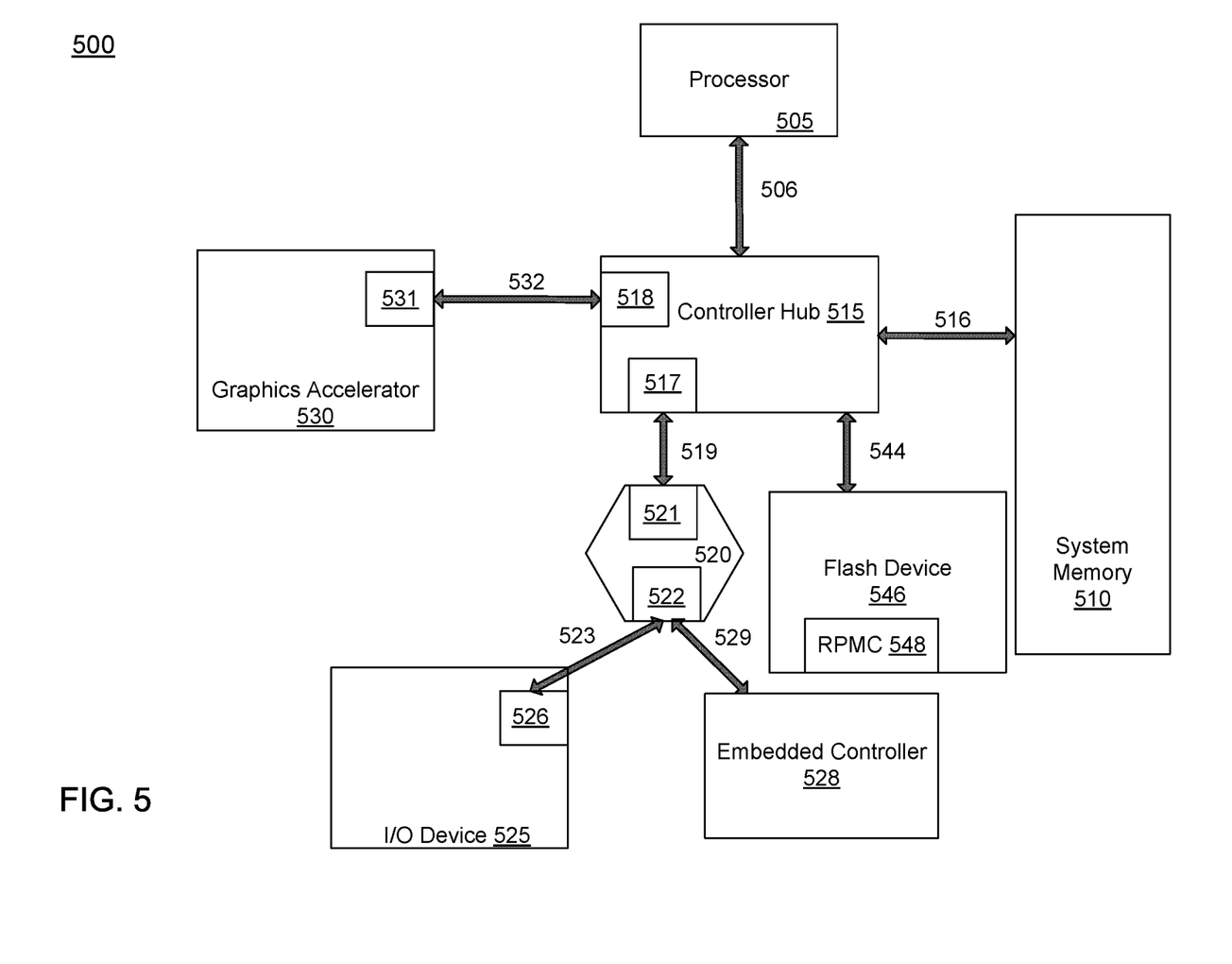
FIG. 5 is an embodiment of a fabric composed of point-to-point links that interconnect a set of components.

Embodiments may be implemented in a wide variety of interconnect structures. Referring to FIG. 5, an embodiment of a fabric composed of point-to-point links that interconnect a set of components is illustrated. System 500 includes processor 505 and system memory 510 coupled to a controller hub 515. Processor 505 includes any processing element, such as a microprocessor, a host processor, an embedded processor, a co-processor, or other processor. Processor 505 is coupled to controller hub 515 through front-side bus (FSB) 506. In one embodiment, FSB 506 is a serial point-to-point interconnect. In an embodiment, where processor 505 and controller hub 515 are implemented on a common semiconductor die, bus 506 may be implemented as an on-die interconnect. In yet another implementation where processor 505 and controller hub 515 are implemented as separate die within a multi-chip package, bus 506 can be implemented as an intra-die interconnect.

System memory 510 includes any memory device, such as random access memory (RAM), non-volatile (NV) memory, or other memory accessible by devices in system 500. System memory 510 is coupled to controller hub 515 through memory interface 516. Examples of a memory interface include a double-data rate (DDR) memory interface, a dual-channel DDR memory interface, and a dynamic RAM (DRAM) memory interface.

In one embodiment, controller hub 515 is a root hub, root complex, or root controller in a PCIe interconnection hierarchy. Examples of controller hub 515 include a chip set, a peripheral controller hub (PCH), a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 505, while controller 515 is to communicate with I/O devices, in a similar manner as described below. In some embodiments, peer-to-peer routing is optionally supported through root complex 515.

Here, controller hub 515 is coupled to switch/bridge 520 through serial link 519. Input/output modules 517 and 521, which may also be referred to as interfaces/ports 517 and 521, include/implement a layered protocol stack to provide communication between controller hub 515 and switch 520. In one embodiment, multiple devices are capable of being coupled to switch 520.

Switch/bridge 520 routes packets/messages from device 525 upstream, i.e., up a hierarchy towards a root complex, to controller hub 515 and downstream, i.e., down a hierarchy away from a root controller, from processor 505 or system memory 510 to device 525. Switch 520, in one embodiment, is referred to as a logical assembly of multiple virtual PCI-to-PCI bridge devices. Device 525 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 525 may include a PCIe to PCI/PCI-X bridge to support legacy or other version PCI devices. Endpoint devices in PCIe are often classified as legacy, PCIe, or root complex integrated endpoints.

As further illustrated in FIG. 5, another device that may couple to switch/bridge 520 is an embedded controller 528, which as described herein may issue requests to leverage replay protection counter services present in another component, namely flash device 546, itself including a set of RPMC counters 548 and coupled to controller hub 515 via an interconnect 544, which in an embodiment may be a SPI interconnect.

Graphics accelerator 530 is also coupled to controller hub 515 through serial link 532. In one embodiment, graphics accelerator 530 is coupled to an MCH, which is coupled to an ICH. Switch 520, and accordingly I/O device 525, is then coupled to the ICH. I/O modules 531 and 518 are also to implement a layered protocol stack to communicate between graphics accelerator 530 and controller hub 515. A graphics controller or the graphics accelerator 530 itself may be integrated in processor 505.

Figure 6:
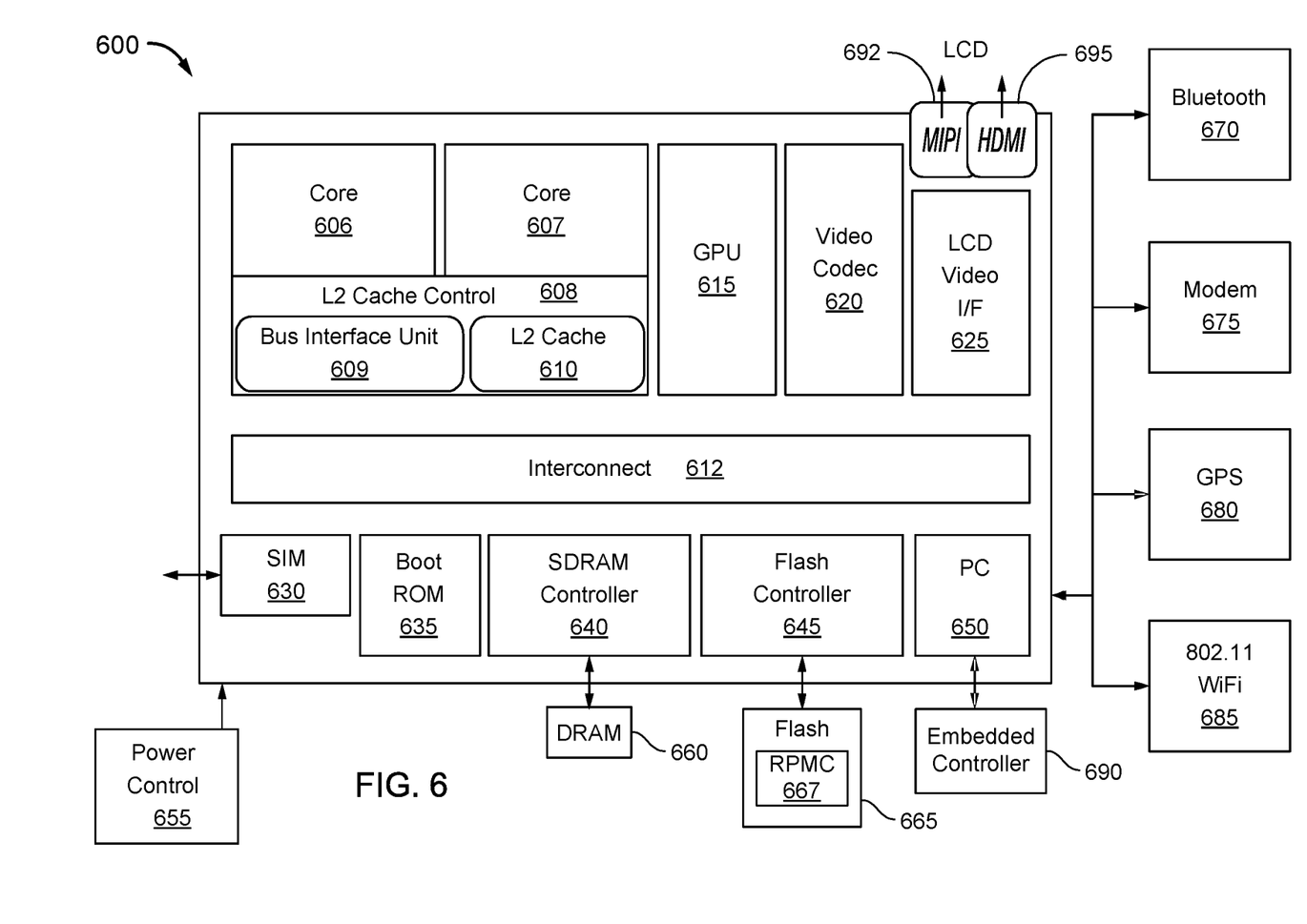
FIG. 6 is an embodiment of a system-on-chip design in accordance with an embodiment.

Turning next to FIG. 6, an embodiment of a SoC design in accordance with an embodiment is depicted. As a specific illustrative example, SoC 600 may be configured for insertion in any type of computing device, ranging from portable device to server system. Here, SoC 600 includes 2 cores 606 and 607. Cores 606 and 607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 606 and 607 are coupled to cache control 608 that is associated with bus interface unit 609 and L2 cache 610 to communicate with other parts of system 600 via an interconnect 612.

Interconnect 612 provides communication channels to the other components, such as a Subscriber Identity Module (SIM) 630 to interface with a SIM card, a boot ROM 635 to hold boot code for execution by cores 606 and 607 to initialize and boot SoC 600, a SDRAM controller 640 to interface with external memory (e.g., DRAM 660), a flash controller 645 to interface with non-volatile memory (e.g., flash memory 665 including RPMC counters 667), a peripheral controller 650 (e.g., via an eSPI interface) to interface with peripherals, such as an embedded controller 690. As described herein, with an implementation, embedded controller 690 may issue requests for replay protection services via peripheral controller 650 (which may include an internal MAF controller having RPMC control circuitry) in turn to interface with corresponding RPMC mapping circuitry and an atomic sequencer present in flash controller 645.

Still referring to FIG. 6, system 600 further includes video codec 620 and video interface 625 to display and receive input (e.g., touch enabled input), GPU 615 to perform graphics related computations, etc. Any of these interconnects/interfaces may incorporate aspects described herein, including hardware-based credit control and bus turnarounds. In addition, the system illustrates peripherals for communication, such as a Bluetooth module 670, 3G modem 675, GPS 680, and WiFi 685. Also included in the system is a power controller 655. Further illustrated in FIG. 6, system 600 may additionally include interfaces including a MIPI interface 692, e.g., to a display, and/or an HDMI interface 695 also which may couple to the same or a different display.

Figure 7:
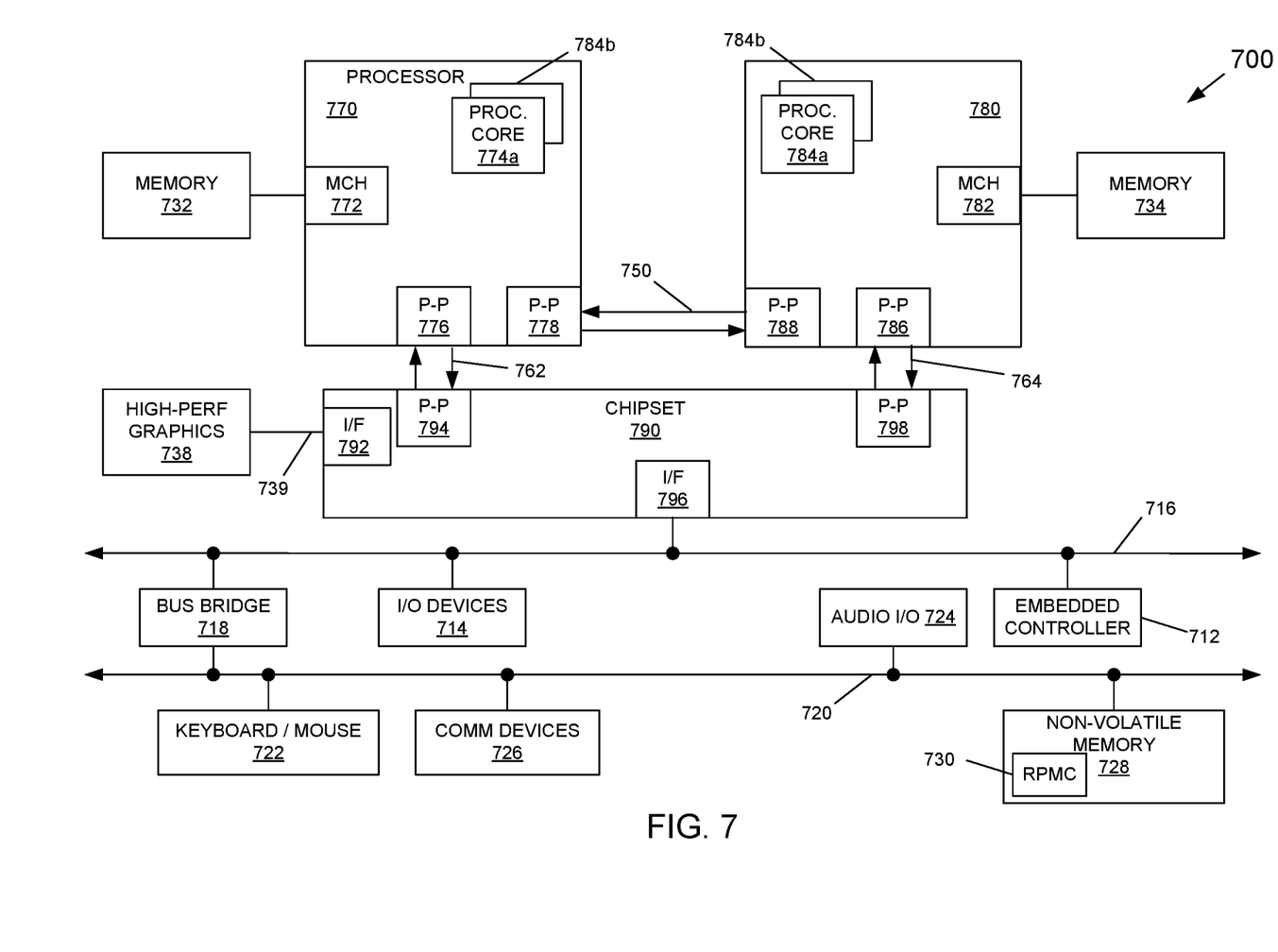
FIG. 7 is a block diagram of a system in accordance with an embodiment of the present invention.

Referring now to FIG. 7, shown is a block diagram of a system in accordance with an embodiment of the present invention. As shown in FIG. 7, multiprocessor system 700 includes a first processor 770 and a second processor 780 coupled via a point-to-point interconnect 750. As shown in FIG. 7, each of processors 770 and 780 may be many core processors including representative first and second processor cores (i.e., processor cores 774a and 774b and processor cores 784a and 784b).

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 764, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a non-volatile memory 728 such as a given non-volatile memory, e.g., a flash memory as described herein including RPMC counters 730. To this end, an embedded controller 712 may request replay protection services leveraging these counters as described herein. Further, an audio I/O 724 may be coupled to second bus 720.

The following examples pertain to further embodiments.

In one example, an apparatus includes: an interface controller to receive a request from an external device coupled to the apparatus to access a flash memory coupled to the apparatus, the request comprising an access request to a RPMC of the flash memory; and a flash controller coupled to the interface controller. The flash controller may include: an atomic sequencer to arbitrate accesses to the RPMC by a plurality of components; and a mapper to map the access request to a selected counter of the RPMC associated with the external device.

In an example, the RPMC comprises a plurality of counters each associated with one of the plurality of components.

In an example, the access request comprises a request to update the selected counter of the RPMC associated with the external device.

In an example, the mapper is to authenticate the access request and in response to the authentication, to send the access request to the atomic sequencer.

In an example, the external device comprises an embedded controller coupled to the apparatus via an eSPI interconnect.

In an example, the interface controller comprises an eSPI controller further comprising a MAF controller to receive the request, where the request comprises an OP1 command included in an eSPI packet.

In an example, the MAF controller is to receive a first request via an alert pin and query the external device as to a cause of the alert pin activation.

In an example, the MAF controller is to: receive a flash request available status from the external device in response to the query; and in response to flash request available status, issue a get command to the external device to obtain the request comprising the access request.

In an example, in response to successful completion of the access request, the MAF controller is to send a status of the access request to the external device.

In an example, the external device is bound to the apparatus during manufacture of a platform including the apparatus and the external device.

In another example, a method comprises: receiving, in a master controller of a SoC of a platform, a first packet comprising a request from a platform component of the platform for a replay protection service to be performed by a RPMC of a non-volatile memory coupled to the SoC; parsing the first packet to obtain the request for the replay protection service and sending the request for the replay protection service to a flash controller of the SoC; authenticating, in the flash controller, that the platform component is authorized to access the RPMC; in response to authenticating that the platform component is authorized to access the RPMC, sending an atomic transaction to the non-volatile memory comprising the request for the replay protection service; and receiving a status of the request for the replay protection service in the flash controller and sending the status to the platform component.

In an example, the method further comprises polling the non-volatile memory, via the flash controller, to obtain the status.

In an example, the method further comprises stalling one or more other requests for a replay protection service received from one or more other components until the atomic transaction completes.

In an example, authenticating that the platform component is authorized to access the RPMC comprises comparing an address of the request for the replay protection service to an address of the RPMC, the RPMC associated with the platform component, the platform component bound to the SoC during manufacture of the platform.

In an example, the method further comprises receiving the first packet comprising an eSPI packet including an OP1 command comprising the request for the replay protection service.

In an example, the method further comprises: receiving, in the master controller, an alert signal from the platform component; requesting from the platform component a cause of the alert signal; receiving a status request from the platform component to determine whether the non-volatile memory is available; and issuing a non-posted command from the master controller to the platform component to cause the platform component to send the request for the replay protection service, the request comprising a non-posted request, where the status comprises a completion for the non-posted request.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system includes: an embedded controller to perform one or more control operations for the system; a flash memory to store information persistently, the flash memory having a replay protection circuit comprising a plurality of RPMCs; and a processor coupled to the embedded controller and the flash memory. In turn, the processor may include: one or more cores; a master controller to receive a request for a replay protection service from the embedded controller; and a flash controller coupled to the master controller. The flash controller may include: a mapper to authenticate the request for the replay protection service from the embedded controller and, in response to authentication of the request, to map the request to a selected one of the plurality of RPMCs; and an atomic sequencer to receive the mapped request from mapper and, based on an arbitration between a plurality of requests including the mapped request, send the mapped request to the flash memory.

In an example, the master controller comprises an eSPI controller coupled to the embedded controller via an eSPI interconnect, the eSPI controller further comprising a MAF controller to receive the request, where the request comprises an OP1 command included in an eSPI packet and the flash memory is coupled to the processor via a SPI interconnect.

In an example, the MAF controller is to receive the request in response to an alert pin protocol between the MAF controller and the embedded controller.

In an example, after receipt of the OP1 command, the MAF controller is to receive an OP2 command included in a second eSPI packet from the embedded controller, and to provide status information from the selected one of the plurality of RPMCs to the embedded controller in response thereto.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an interface controller to receive a request from an external device separate from and coupled to the apparatus via a first interconnect, the request for access to a flash memory coupled to the apparatus via a second interconnect, the request comprising an access request to a replay protection monotonic counter (RPMC) of the flash memory; and
a flash controller coupled to the interface controller, the flash controller comprising:
an atomic sequencer to arbitrate accesses to the RPMC by a plurality of components; and
a mapper to map the access request to a selected counter of the RPMC associated with the external device.

2. The apparatus of claim 1, wherein the RPMC comprises a plurality of counters each associated with one of the plurality of components.

3. The apparatus of claim 2, wherein the access request comprises a request to update the selected counter of the RPMC associated with the external device.

4. The apparatus of claim 1, wherein the mapper is to authenticate the access request and in response to the authentication, to send the access request to the atomic sequencer.

5. The apparatus of claim 1, wherein the external device comprises an embedded controller coupled to the apparatus via an enhanced serial peripheral interface (eSPI) interconnect.

6. The apparatus of claim 5, wherein the interface controller comprises an eSPI controller, the eSPI controller further comprising a master attached flash (MAF) controller to receive the request, wherein the request comprises an OP1 command included in an eSPI packet.

7. The apparatus of claim 6, wherein the MAF controller is to receive a first request via an alert pin and query the external device as to a cause of the alert pin activation.

8. The apparatus of claim 7, wherein the MAF controller is to:
receive a flash request available status from the external device in response to the query; and in response to the flash request available status, issue a get command to the external device to obtain the request comprising the access request.

9. The apparatus of claim 8, wherein in response to successful completion of the access request, the MAF controller is to send a status of the access request to the external device.

10. The apparatus of claim 1, wherein the external device is bound to the apparatus during manufacture of a platform including the apparatus and the external device.

11. A non-transitory machine-readable medium having stored thereon instructions, which if performed by a machine cause the machine to perform a method comprising:
receiving, in a master controller of a system on chip (SoC) of a platform, a first packet comprising a request from a platform component of the platform external to the SoC for a replay protection service to be performed by a replay protection monotonic counter (RPMC) of a non-volatile memory coupled to the SoC;
parsing the first packet to obtain the request for the replay protection service and sending the request for the replay protection service to a flash controller of the SoC;
authenticating, in the flash controller, that the platform component is authorized to access the RPMC;
in response to authenticating that the platform component is authorized to access the RPMC, sending an atomic transaction to the non-volatile memory comprising the request for the replay protection service; and
receiving a status of the request for the replay protection service in the flash controller and sending the status to the platform component.

12. The non-transitory machine-readable medium of claim 11, wherein the method further comprises polling the non-volatile memory, via the flash controller, to obtain the status.

13. The non-transitory machine-readable medium of claim 11, wherein the method further comprises stalling one or more other requests for a replay protection service received from one or more other components until the atomic transaction completes.

14. The non-transitory machine-readable medium of claim 11, wherein authenticating that the platform component is authorized to access the RPMC comprises comparing an address of the request for the replay protection service to an address of the RPMC, the RPMC associated with the platform component, the platform component bound to the SoC during manufacture of the platform.

15. The non-transitory machine-readable medium of claim 11, wherein the method further comprises receiving the first packet comprising an enhanced serial peripheral interface (eSPI) packet, the eSPI packet including an OP1 command comprising the request for the replay protection service.

16. The non-transitory machine-readable medium of claim 11, wherein the method further comprises:
receiving, in the master controller, an alert signal from the platform component;
requesting from the platform component a cause of the alert signal;
receiving a status request from the platform component to determine whether the non-volatile memory is available; and
issuing a non-posted command from the master controller to the platform component to cause the platform component to send the request for the replay protection service, the request comprising a non-posted request, wherein the status comprises a completion for the non-posted request.

17. A system comprising:
an embedded controller to perform one or more control operations for the system;
a flash memory to store information persistently, the flash memory having a replay protection circuit comprising a plurality of replay protection monotonic counters (RPMCs); and
a processor coupled to the embedded controller and the flash memory, the processor comprising:
one or more cores;
a master controller to receive a request for a replay protection service from the embedded controller; and
a flash controller coupled to the master controller, the flash controller comprising:
a mapper to authenticate the request for the replay protection service from the embedded controller and, in response to authentication of the request, to map the request to a selected one of the plurality of RPMCs; and
an atomic sequencer to receive the mapped request from the mapper and, based on an arbitration between a plurality of requests including the mapped request, send the mapped request to the flash memory.

18. The system of claim 17, wherein the master controller comprises an enhanced serial peripheral interface (eSPI) controller coupled to the embedded controller via an eSPI interconnect, the eSPI controller further comprising a master attached flash (MAF) controller to receive the request, wherein the request comprises an OP1 command included in an eSPI packet, the flash memory coupled to the processor via a serial peripheral interface (SPI) interconnect.

19. The system of claim 18, wherein the MAF controller is to receive the request in response to an alert pin protocol between the MAF controller and the embedded controller.

20. The system of claim 17, wherein after receipt of the OP1 command, the MAF controller is to receive an OP2 command included in a second eSPI packet from the embedded controller, and to provide status information from the selected one of the plurality of RPMCs to the embedded controller in response thereto.

* * * * *